(12) United States Patent  
Opolka

(10) Patent No.: US 8,410,753 B2  
(45) Date of Patent: Apr. 2, 2013

(54) RECHARGEABLE HAND-HELD DEVICE AND CHARGER THEREFOR

(75) Inventor: Rainer Opolka, Solingen (DE)

(73) Assignee: Zweibrueder Optoelectronics GmbH, Solingen (DE)

( * ) Notice: Subject to any disclaimer, the term of this patent is extended or adjusted under 35 U.S.C. 154(b) by 285 days.

(21) Appl. No.: 12/691,041

(22) Filed: Jan. 21, 2010

(65) Prior Publication Data

US 2010/0194337 A1  Aug. 5, 2010

(30) Foreign Application Priority Data

Feb. 4, 2009  (DE) .......................... 10 2009 007 359

(51) Int. Cl.  
*H02J 7/00*  (2006.01)  
*H02J 7/02*  (2006.01)

(52) U.S. Cl. .......................... 320/114; 320/111; 320/115

(58) Field of Classification Search .................. 320/111, 320/114, 115  
See application file for complete search history.

(56) References Cited

U.S. PATENT DOCUMENTS

| | | | |
|---|---|---|---|
| 3,713,614 A * | 1/1973 | Taylor ........................... | 248/632 |
| 5,190,369 A * | 3/1993 | Pace ............................... | 362/186 |
| 5,909,100 A * | 6/1999 | Watanabe et al. .............. | 320/108 |
| 2002/0093309 A1* | 7/2002 | Peele ............................. | 320/107 |
| 2003/0218445 A1* | 11/2003 | Behar ........................... | 320/114 |
| 2005/0063179 A1* | 3/2005 | Niemann ...................... | 362/184 |
| 2005/0116684 A1* | 6/2005 | Kim .............................. | 320/114 |
| 2005/0189913 A1* | 9/2005 | Vitanov et al. ................ | 320/114 |
| 2007/0279002 A1* | 12/2007 | Partovi .......................... | 320/115 |
| 2008/0150482 A1* | 6/2008 | Yazdi et al. .................... | 320/115 |
| 2008/0231234 A1* | 9/2008 | Mah .............................. | 320/138 |
| 2008/0284374 A1* | 11/2008 | Gardner et al. ............... | 320/115 |
| 2010/0033127 A1* | 2/2010 | Griffin et al. ................. | 320/111 |
| 2010/0207576 A1* | 8/2010 | Elizalde Rodarte .......... | 320/115 |
| 2011/0073658 A1* | 3/2011 | Vassura et al. ............ | 235/472.01 |

FOREIGN PATENT DOCUMENTS

WO    WO-9929009    6/1999

* cited by examiner

*Primary Examiner* — Drew A Dunn  
*Assistant Examiner* — Nathaniel Pelton  
(74) *Attorney, Agent, or Firm* — Andrew Wilford

(57) ABSTRACT

A hand-held device has a rechargeable battery, with contacts connected to the battery, and a ferromagnetic body. A charger has contacts complementary to and engageable with the contacts of the device and a magnet capable of attracting the ferromagnetic body of the device and holding the device in a charging position with the contacts of the device engaging the contacts of the charger.

12 Claims, 5 Drawing Sheets

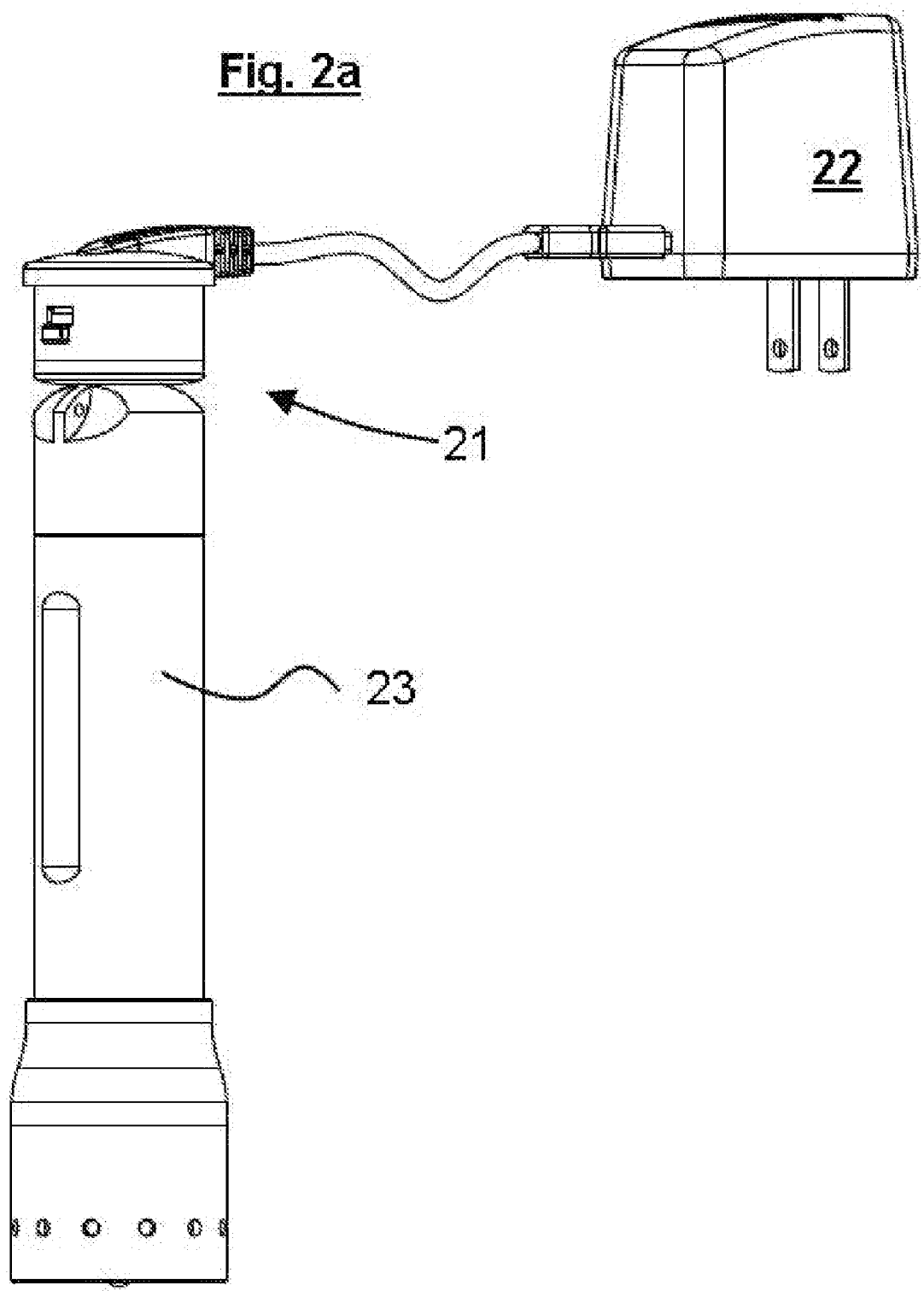

RECHARGEABLE HAND-HELD DEVICE AND CHARGER THEREFOR

FIELD OF THE INVENTION

The present invention relates to a rechargeable hand-held device, in particular a flashlight. More particularly this invention concerns a charger for such a device.

BACKGROUND OF THE INVENTION

Such a charging setup is known, for example, from WO 1999/029009 that discloses a charger for chargeable electric hand-held devices. It has a mount for the hand-held device, into or onto which the hand-held device may be plugged, and a power supply normally plugged to line and having a step-down transformer connectable to the hand-held device fitted to the mount by electric contacts. The hand-held device can be fixed on the mount in various angular positions (along the longitudinal axis) relative to the plug-in direction, the electric contacts being associated with the positions.

In the majority of known chargers a plug must be fitted to the hand-held device, or vice versa, for charging the device. In other words, current charging setups always comprise at least one plug, and a socket on the device. By way of example, reference is made to currently known chargers of cellular phones, notebooks, or digital cameras.

Since the hand-held devices usually have an opening, into which a plug is inserted, the disadvantageous risk exists that the opening may be fouled in time, and may be plugged up by foreign bodies such that the recharging of the battery is impeded. Furthermore, the charger openings are not very attractive.

A further disadvantage of known charging setups exists particularly for hand-held devices that must be removed from the charger as quickly as possible. For example, flashlights or the like used as part of police or firefighter equipment, must be removable from the charger in a quick manner in case of an emergency. Currently used connectors may easily be damaged in this manner.

OBJECTS OF THE INVENTION

It is therefore an object of the present invention to provide an improved charging setup comprising a charger and a rechargeable hand-held device.

Another object is the provision of such an improved charger/rechargeable-device combination that overcomes the above-given disadvantages, in particular that allows the rechargeable device to be coupled to and decoupled from the charger with ease.

Another object is such a charger that facilitates quick removal of the hand-held device from the charger.

SUMMARY OF THE INVENTION

A hand-held device has a rechargeable battery, with contacts connected to the battery, and a ferromagnetic body. A charger has contacts complementary to and engageable with the contacts of the device and a magnet capable of attracting the ferromagnetic body of the device and holding the device in a charging position with the contacts of the device engaging the contacts of the charger.

Thus the object of the invention is attained in that the magnet on the charger and the body alone serve to hold the hand-held device on the charger with the contacts of the hand-held device and the charger in good electrical contact. Thus the magnetic force ensures a permanent, but easy to disconnect connection. In this manner the contacts on the hand-held device may fit complementarily with the device to provide an attractive clean look to the assembly. Due to the hand-held device and the charger not being connected to each other via a connector during the charging operation, but rather being positioned on top of each other, quick removal of the hand-held device is now possible. The charging setup according to the invention now provides a possibility to policemen and firefighters of storing flashlight or the like such that it can be quickly removed, even while charging. Furthermore, a higher degree of effectiveness is achieved due to the claimed type of charging, as opposed to known and contactless functioning charging systems, where, for example, inductive contacts are used.

According to an advantageous embodiment the charger has an annular magnet having a generally central bore or hole, thus facilitating the centering of the contacts relative to each other. Preferably, the charger has two electric charger contacts, that is one surrounding the magnet as the charger contact ring, and one that is formed as a charger contact pin guided through the bore of the magnet, both charger contacts project past the plane of the magnet. Due to the rotational symmetrical embodiment of the charger contacts the hand-held device can be attached in a plurality of positions, with relative angular position at least being irrelevant, thus improving the manageability of the device.

Due to the fact that the magnet has a central hole, further advantages arise with regard to the positioning of the hand-held device, because the contacts of the hand-held device advantageously are a central contact pin engageable with the charger contact pin and a contact ring surrounding the device contact pin. The device contact pin is ferromagnetic and the charger contact pin is preferably nonmagnetic or paramagnetic, preferably aluminum. If both contact pins are brought together, the charger contact pin is pushed in by the ferromagnetic device pin. Due to the preferred rotationally symmetrical design, the device contact pin is automatically contacted by the charger contact pin, thus significantly facilitating fitting of the hand-held device to the charger in the charging position.

According to a further preferred embodiment the invention provides that the charger contact pin is made from paramagnetic material, and a ferromagnetic plate or body is provided on its rear or upper end so as to coact with the adjacent annular permanent magnet of the charger. Advantageously, an insulator is provided between the charger contact pin and the magnet to avoid short circuits during the charging operation. If the hand-held device is not connected to the charger, the ferromagnetic plate is pulled in and down by the magnet such that the plate sits on the insulator and the lower end face of the charger contact pin projects a relatively far distance down from the plane of the surrounding magnet. As soon as the hand-held device is connected to the charger, the charger contact pin is pushed up in the magnet such that the plate is lifted off the insulator. However, due to the magnetic force of attraction the charger contact pin is still biased magnetically down onto the contact pin of the hand-held device such that an uninterrupted charging operation is ensured, even in case of slight vibrations.

In order to protect the device from contamination or the like, the charger contacts and the magnet are arranged in a housing.

Particularly in the case of flashlights it is common that a pushbutton is arranged on the end side, by means of which the flashlight may be operated. According to a particular embodiment of the present invention the invention provides that the contact device is arranged in the pushbutton. The arranged is advantageous particularly for storing the flashlight. Furthermore, the pushbutton is usually embodied in a spherical manner, which is an advantage with regard to the permanent alignment of the flashlight in the charger. Furthermore, preferably at least one locking diode is provided in the circuit of the flashlight such that no short circuit occurs upon actuating the pushbutton having the integrated contact assembly.

According to a preferred embodiment the charger is arranged on a mount, which preferably can be attached to a wall or the like such that the hand-held device is always stored and can be charged at the same location, which is an advantage for control rooms of fire stations and police departments.

BRIEF DESCRIPTION OF THE DRAWING

The above and other objects, features, and advantages will become more readily apparent from the following description, reference being made to the accompanying drawing in which:

FIG. 2a shows a concrete embodiment of a charger.

SPECIFIC DESCRIPTION

Figure 1A:
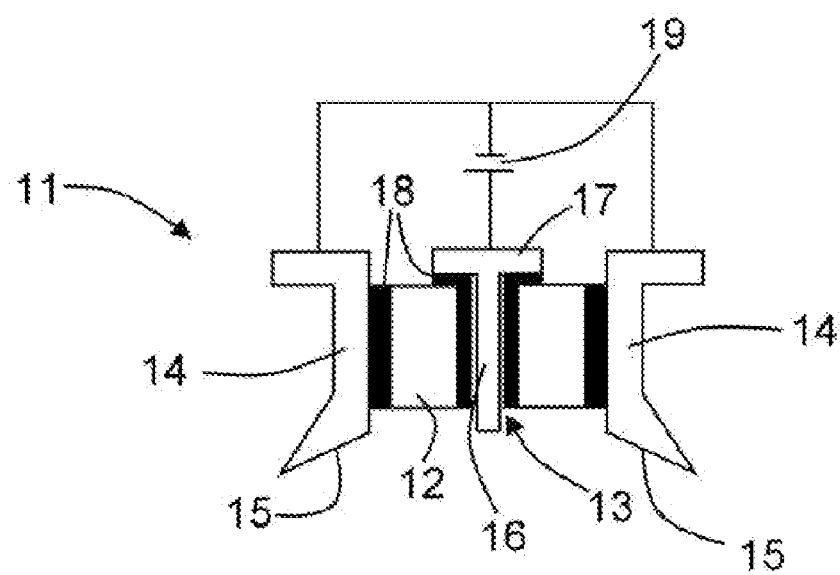
FIG. 1a shows a charger contact assembly.

As seen in FIG. 1a a charging setup according to the invention has a charger contact assembly 11 with an annular magnet 12 formed with a central bore 13. The magnet 12 is formed by a charger contact ring 14 having an end face 15 on its bottom side. A paramagnetic charger contact pin 16 extends through the bore 13 and has a ferromagnetic plate 17 at its upper end with a radius greater than the radius of the bore 13 in the magnet 12. In order to avoid short circuits, insulators 18 are provided between the charger contacts 14 and 16 and the magnet 12. Of course, the charger contacts 14 and 16 are connected to a power source shown schematically as a battery at 19, although typically it is formed by a power cord, line plug, stepdown transformer, and rectifying circuit.

Figure 1B:
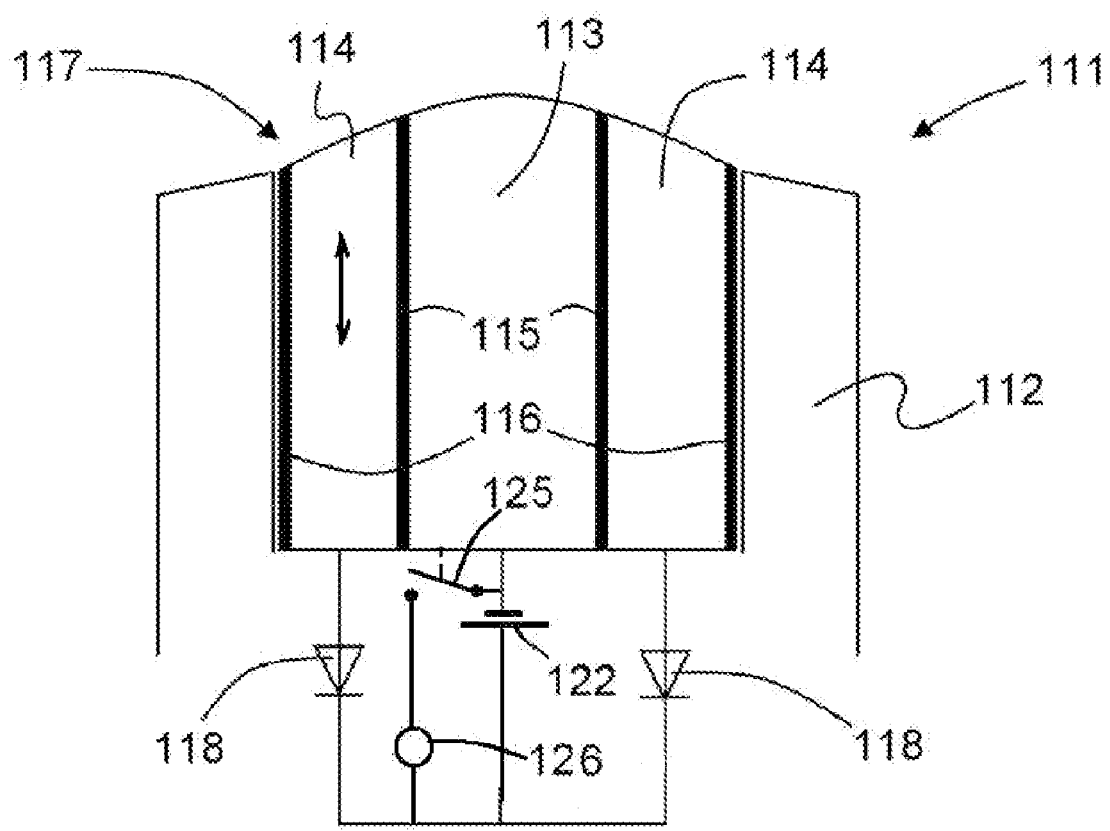
FIG. 1b shows a contact assembly on a hand-held device.

As shown in FIG. 1b a device contact assembly 111 on a hand-held device 112 is generally complementary to the charger contact assembly 11 and has a central contact pin 113 and a contact ring 114. Insulators 115 and 116 are also provided in the device contact assembly 111, particularly between the contact pin 113 and the contact ring 114 for avoiding short circuits.

In the illustrated embodiment the device contact assembly 111 is integrated into a pushbutton 117 that can operate the switch 125. Blocking diodes 118 are provided in the hand-held device such that no short circuit may occur between the contacts 113 and 114 during actuation of the pushbutton 117 or during the storage outside the charger. Inside the device or housing 112 is a rechargeable battery 122 across which a load, here a light source 126, and a switch 125 are connected in series.

Figure 1C:
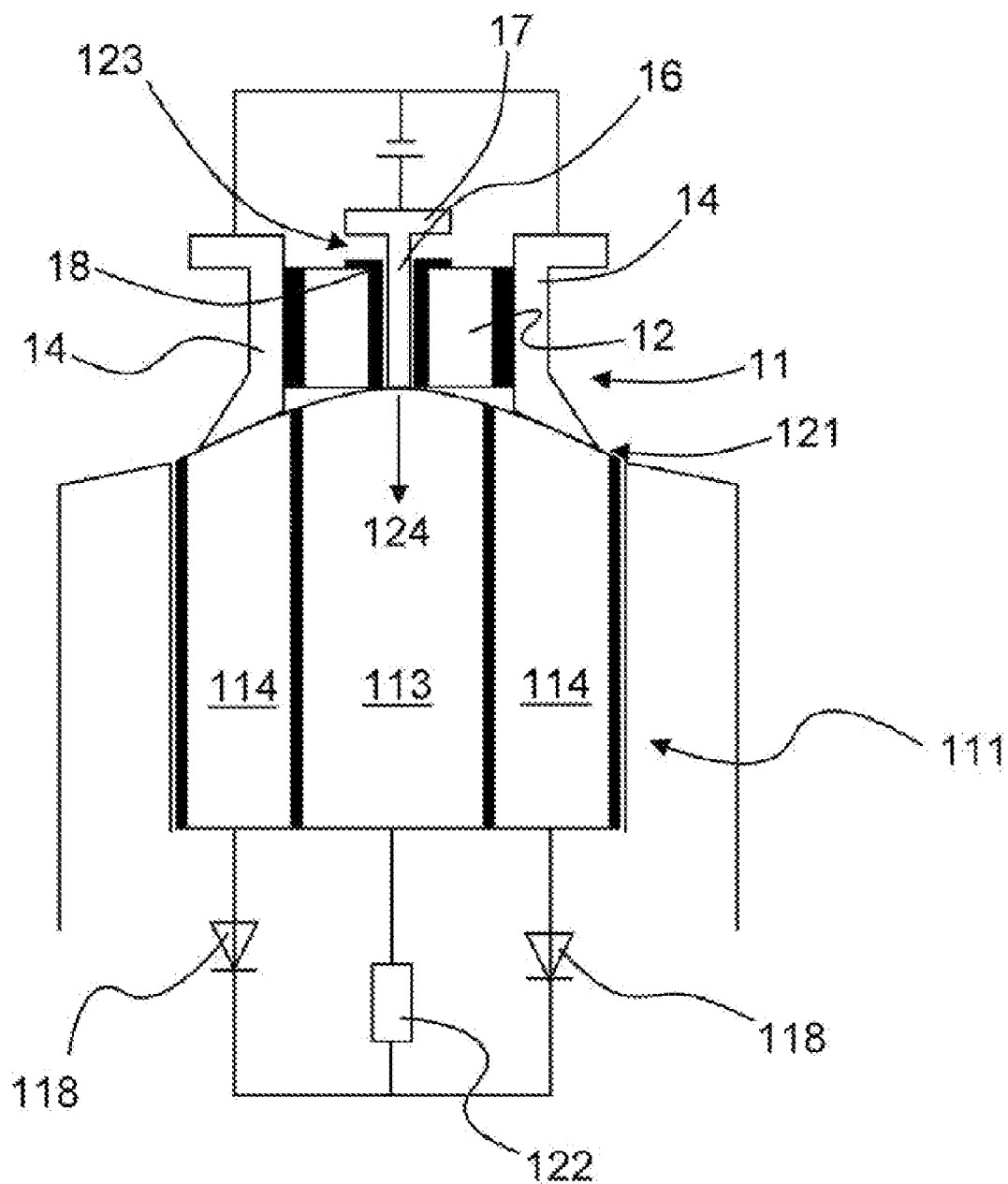
FIG. 1c shows the hand-held device in the charging position.

In the charging position (FIG. 1c) the charger contact assembly 11 and the device contact assembly 111 are brought into mutual contact at 121 such that the battery 122 is charged. It can be clearly seen that the charger contact pin 16 is pushed back upward to a limited extent such that a space 123 is created between the insulator 18 and the ferromagnetic plate 17. Together with the ferromagnetic plate 17 the charger contact pin 16 pressed down onto the contact pin 113 in the direction of arrow 124 by means of the magnetic forces of the magnet 12 such that the connection is not interrupted, even in case of slight vibrations.

Figure 2B:
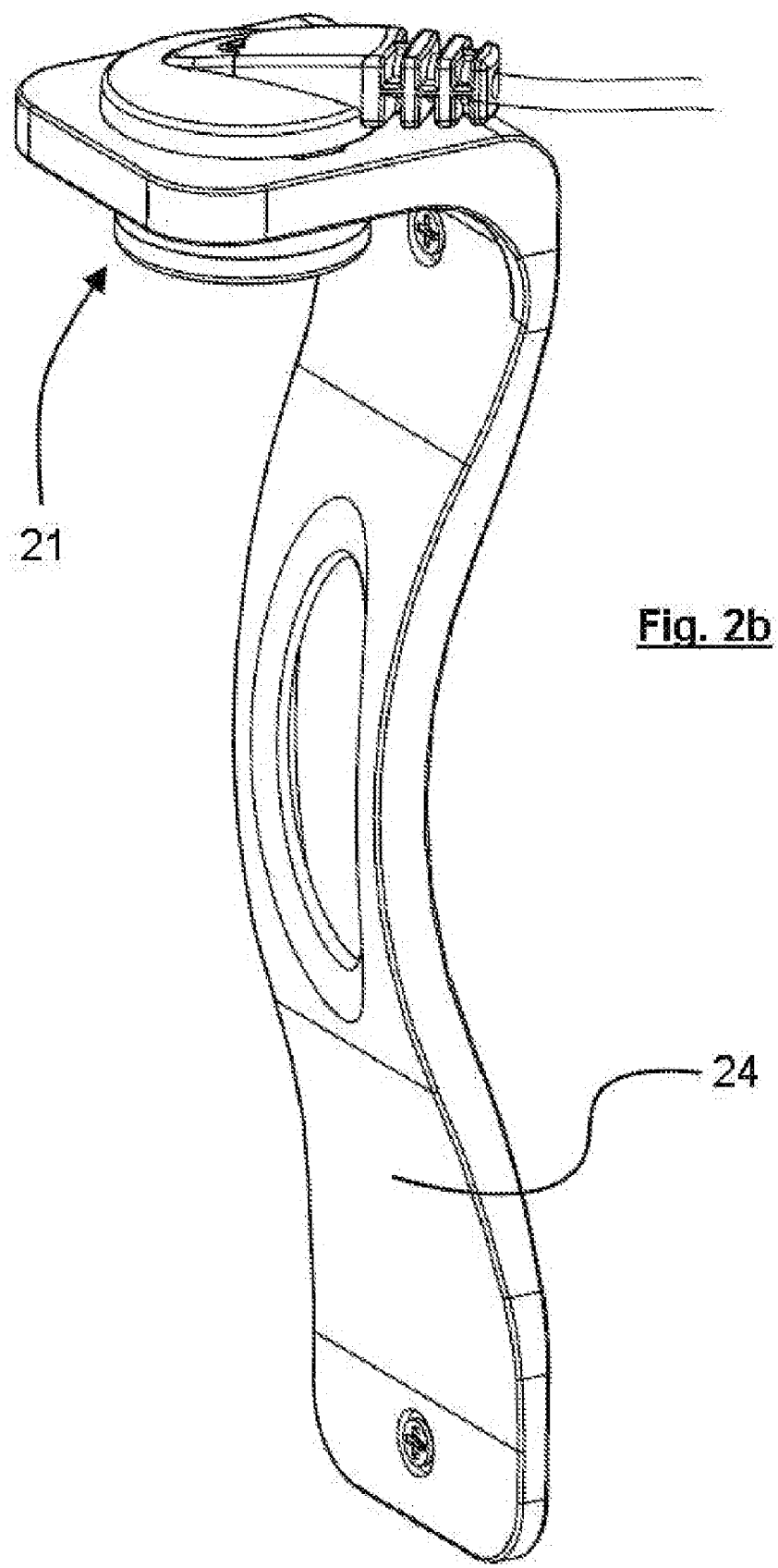
FIG. 2b shows a concrete embodiment of a mount.
Figure 2C:
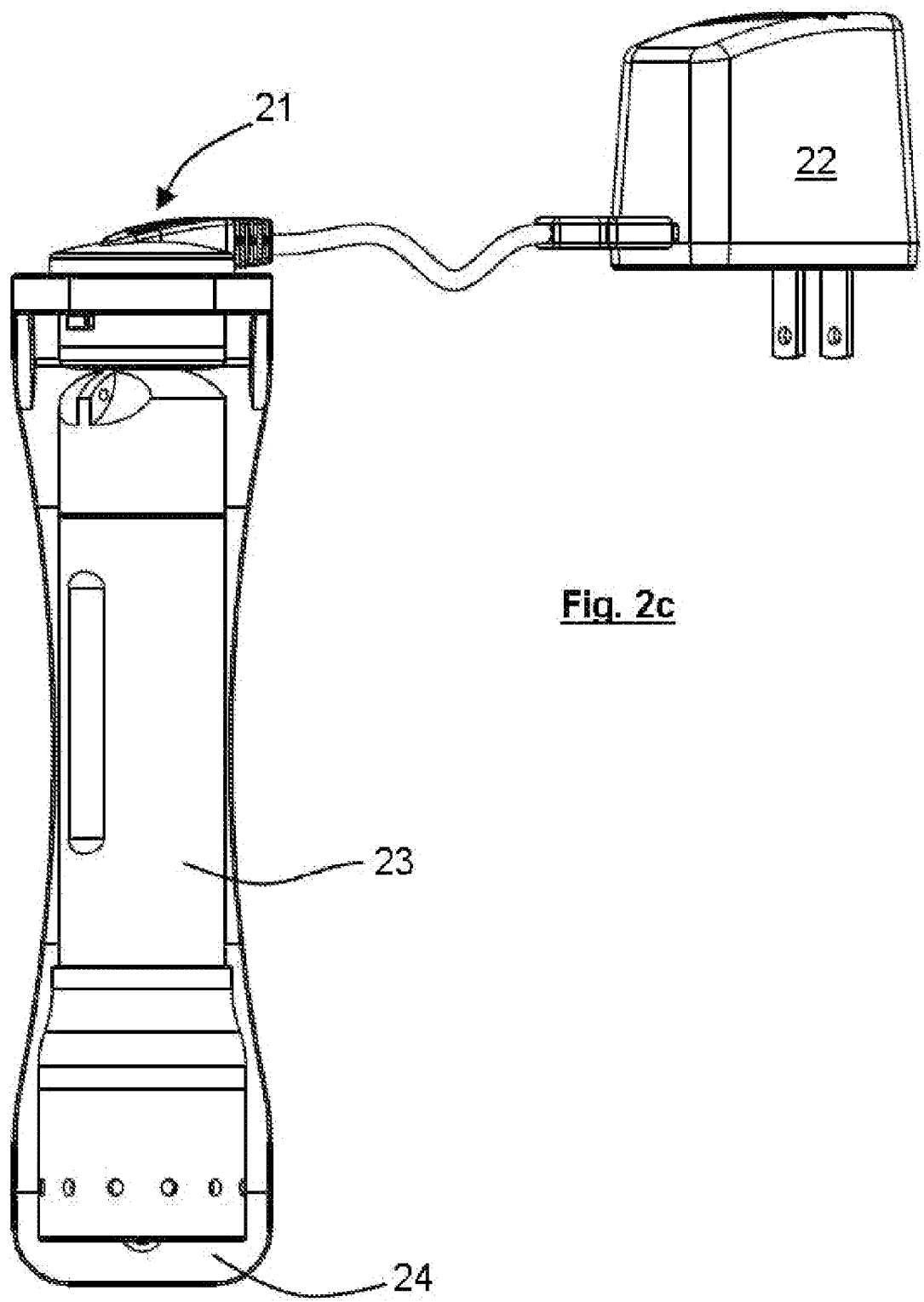
FIG. 2c shows a concrete embodiment of a mount having a charger and a flashlight thereon.

FIG. 2a shows a concrete embodiment of a charger 21 coupled to a power plug 22 and connected to the contact assembly of a flashlight 23. The charger 21 may be fixed on a mount 24 (FIG. 2b), which, for example, may be screwed to a wall. Merely by way of example FIG. 2c shows a flashlight 23 supported in a mount 24 that is arranged in a perpendicular manner in the charging position. Such mounts are advantageous as flashlight mounts particularly for fire stations and police departments for the reasons stated above

I claim:
1. In combination:
a hand-held device having a ferromagnetic body, a rechargeable battery in the body, and contacts connected to the battery and on the body; and
a charger having
a magnet having an end face, formed with a central throughgoing hole, and capable of attracting the ferromagnetic body and holding the body in a charging position,
a central contact pin extending through the hole, and
a ring contact surrounding the central contact pin, the ring contact and central contact pin having respective end faces engaging the contacts of the charger in the charging position, the central contact pin having a widened inner end opposite its end face and being shiftable from a position with its inner end resting on a back face of the magnet and its end face projecting a predetermined distance past the end face of the magnet and a raised position with its inner end spaced from the back face of the magnet and its end face closer to the end face of the magnet.
2. The combination defined in claim 1 wherein the magnet is a permanent magnet.
3. The combination defined in claim 1 wherein the widened inner end is ferromagnetic and the rest of the central contact pin is paramagnetic or nonmagnetic, whereby the magnet biases the central contact pin into a position with its end face projecting past the magnet and its inner end sitting on the magnet.
4. The combination defined in claim 1 wherein the central contact pin is T-shaped.
5. The combination defined in claim 1 wherein the charger further has a housing forming the body, the magnet and ring contact are fixed in the housing, and the central contact pin can shift relative to the magnet and ring contact.
6. The combination defined in claim 1 wherein an end face of the ring contact is substantially frustoconical, the contact pin having an end face offset rearward of the end face of the outer contact ring.
7. The combination defined in claim 1 wherein the ring contact is of nonmagnetic material.
8. The combination defined in claim 7 wherein the ring contact is of aluminum.
9. The combination defined in claim 1 wherein the body is a housing holding the rechargeable battery, the combination further comprising a load and a switch in the housing connected between the load and the rechargeable battery, the device contacts being shiftable on the housing and connected to the switch to operate same.
10. The combination defined in claim 1 wherein the device has a load on the body connected to the battery, and a blocking diode connected between one of the device contacts and the battery.

11. The combination defined in claim 1 wherein the device is a flashlight and has a housing forming the body and holding the battery, a light source, and a switch connected between the light source and the battery.

12. The combination defined in claim 1 wherein the mount is adapted to be mounted on a wall with the face directed downward.

\* \* \* \* \*